United States Patent [19]

Kimberley

[11] 4,199,051

[45] Apr. 22, 1980

[54] EGG TRANSPORTING SYSTEM

[75] Inventor: Walter R. Kimberley, Holland, Mich.

[73] Assignee: U.S. Industries, Inc., New York, N.Y.

[21] Appl. No.: 872,206

[22] Filed: Jan. 25, 1978

[51] Int. Cl.² .............................................. B65G 47/04
[52] U.S. Cl. .................................. 198/482; 198/503; 198/655; 198/801; 119/48
[58] Field of Search ............... 198/476, 482, 484, 503, 198/599, 607, 635, 655, 796, 801, 646, 448, 449, 445; 119/48

[56] References Cited

U.S. PATENT DOCUMENTS

| | | | |
|---|---|---|---|
| 2,187,842 | 1/1940 | Rheinstrom | 198/445 |
| 2,712,376 | 7/1955 | Bruestle | 198/796 |
| 3,200,559 | 8/1965 | Curtis | 198/503 |
| 3,626,905 | 12/1971 | Giesbert et al. | 119/48 |
| 3,672,485 | 6/1972 | Walters | 198/482 |
| 3,789,802 | 2/1974 | Conley | 119/48 |
| 3,986,598 | 10/1976 | Grantham | 198/503 |

FOREIGN PATENT DOCUMENTS

| | | | |
|---|---|---|---|
| 2235767 | 2/1974 | Fed. Rep. of Germany | 119/48 |
| 2429620 | 1/1976 | Fed. Rep. of Germany | 198/655 |

*Primary Examiner*—Joseph E. Valenza

*Attorney, Agent, or Firm*—Price, Heneveld, Huizenga & Cooper

[57] ABSTRACT

An egg transporting system for receiving eggs from a plurality of egg belt conveyors leading from cages of a poultry installation receives eggs on an input side and transfers them to an opposite side of the system to an accumulation conveyor. The transporting system includes an elevator having a plurality of generally U-shaped egg transporting cradles with asymmetric legs for receiving and cradling eggs at the input side and holding and transferring eggs on the discharge side while providing a smooth transition of the egg from one leg to the other as the eggs are moved from one side of the vertical elevator to the other side. A plurality of the cradles are mounted adjacent one another to cross bars extending between endless loop drives with vertically spaced rows of cradles in abutting contact to present substantially continuous egg receiving openings to the belt conveyors. In one embodiment, the conveyor has an inclined input end to facilitate transfer of eggs into the cradles and improved mounting system for simplifying the attachment of the egg conveyors to the input side of the elevator. In some embodiments, an improved egg counting assembly is mounted to the output side of the elevator for singulating and counting the eggs collected by the system and transferred onto the main conveyor.

13 Claims, 10 Drawing Figures

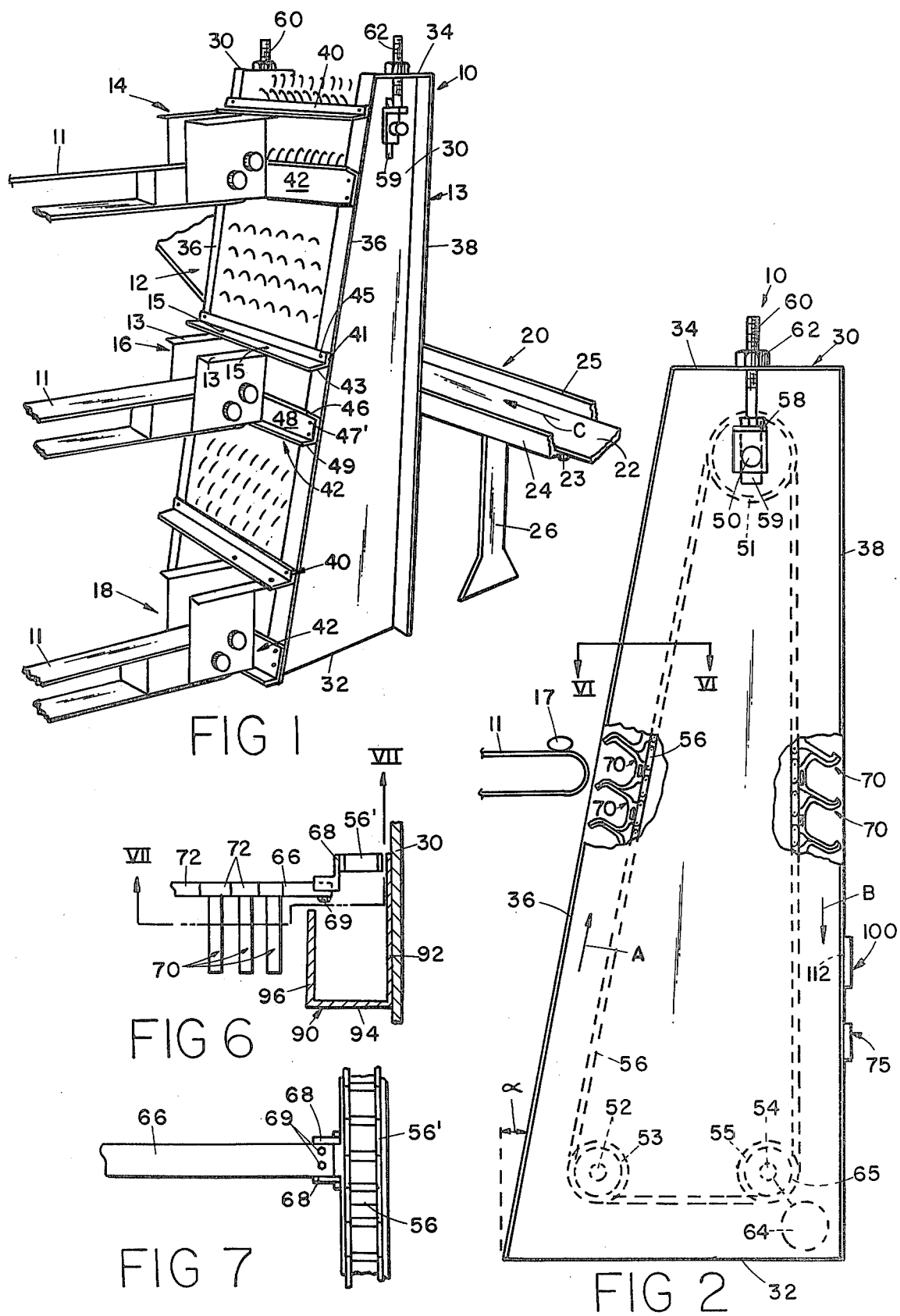

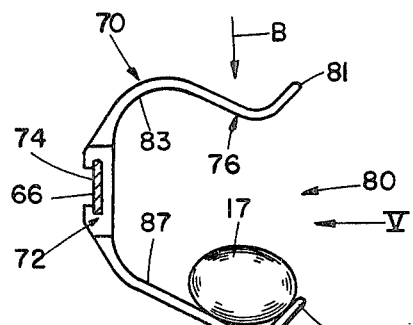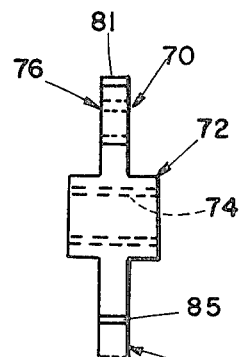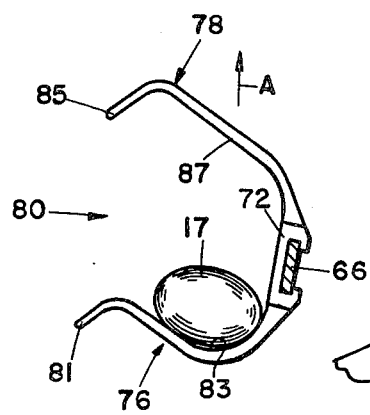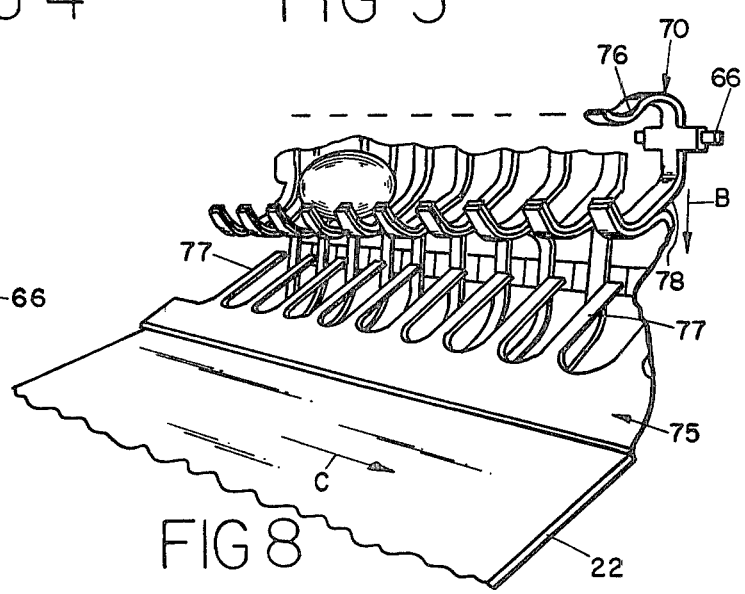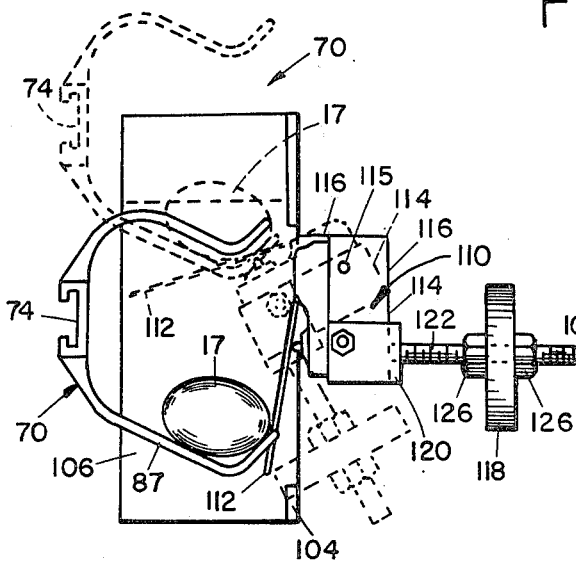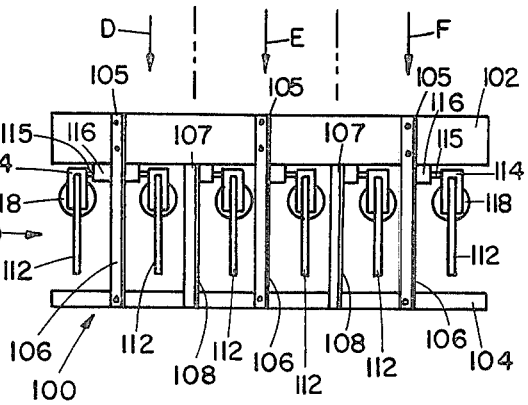

EGG TRANSPORTING SYSTEM

BACKGROUND OF THE INVENTION

The present invention relates to egg handling apparatus and particularly to an egg collecting and transferring system.

In automated poultry systems used today, hens are caged in tiers of cages with egg collecting and conveying belts extending along the front of the cages for automatically transporting eggs from each of the cages to a central processing area. Since the cages are arranged in vertically spaced tiers, the egg collecting belts similarly are vertically displaced thus making it necessary to provide a collecting mechanism for receiving eggs at different vertical levels. The mechanism then transports the eggs to an accumulating or main conveyor extending across the ends of each row of cages such that all of the eggs from the installation can be transported to a centralized processing and packaging area.

There have been several methods proposed for such a collection and transferring process, the most common of which is to provide a generally vertically movable egg receiving assembly which receives eggs at different vertical levels and lowers them to a main conveyor positioned below the level of the input egg belt conveyors. The difficulty with such a system lies in the fact that the main conveyor must be positioned below the lowermost input egg belt conveyor thereby putting severe restrictions on the overall system installation.

U.S. Pat. No. 3,166,175, issued Jan. 19, 1965, to J. S. Kurtz et al and assigned to the present assignee discloses an egg collecting and conveying system by which an elevator is employed which receives eggs on one side, carries them up and over the top of an endless loop egg holding mechanism and transfers the eggs from one set of fingers on the input side of the conveyor to another set of adjacent fingers as the eggs are carried over the top of the elevator. This system permits the discharge of the eggs to a main conveyor which is positioned on the opposite side of the elevator at any convenient height. Although this system permits a greater flexibility in the design of the overall egg handling installation, it suffers from the requirement that the timing of the eggs on their arrival and discharge to and from the unit is critical to prevent breakage of the eggs and when transferring the eggs from one set of fingers to another set, breakage is not uncommon.

Other egg elevating systems have been proposed by which generally curved fingers are individually attached to a wide belt and receive eggs on an input side of an elevator and transfer the eggs to an opposite facing leg as the eggs move over the top of the elevator. Such a symmetrical arrangement, however, is not believed to be effective in both receiving and discharging the eggs since different egg positions are desirable for the loading and unloading of the system in order to prevent breakage. Thus, on the input side of the system it is desired to present to the incoming eggs, an opening by which the eggs can positively be cradled into egg handling members and at the same time transferred at the discharge end to a position extended away from the cradle whereupon the eggs can be more easily removed from the elevator without breakage. Further, with the fingers permanently secured to a fixed width belt modifications to the installations or repairs are difficult or even impossible without replacement of the entire unit.

Accordingly, there exists a need for improved egg handling elevator which takes these different design considerations into account and provides a flexible system which can be adapted for installations with different numbers of infeed egg conveying belts and different levels of output main conveyors.

SUMMARY OF THE INVENTION

The present invention overcomes the deficiencies of the prior art by providing an egg collector and elevator in which a plurality of rows of egg transporting cradles extend between a pair of endless loop members rotating in a closed path such that one leg of the generally U-shaped cradles receive eggs from an input side and transfers them to a second leg of the cradle whereupon the eggs are discharged onto a main conveyor. The egg transporting cradles comprise asymmetric fingers with a first finger having a curved configuration for receiving and cradling eggs adjacent the base and the second leg or finger having a substantially lineal shape with a lip such that as the eggs are transferred from the first to the second leg, they roll out to the end of the second finger being held by the lip for easy removal from the conveyor by stripping fingers.

In the preferred embodiment, the egg transporting cradles are made of a resilient polymeric material such that if an egg strikes an end of a finger it provides a resilient cushioning impact preventing breaking of the eggs and permits entry of the egg when the next opening is available.

In some embodiments of the invention, the input side of the elevator is inclined to further facilitate entry of the eggs into the egg transporting cradles. In other embodiments of the invention, improved mounting brackets for belt type egg input conveyors are provided. In still further embodiments of the invention, an improved egg singulating and counting means are attached to the output side of the elevator.

These and other objects, features, and advantages of the present invention will become readily apparent upon reading the following description thereof together with the accompanying drawings in which:

BRIEF DESCRIPTION OF THE DRAWINGS

FIG. 1 is a fragmentary right front perspective view of the apparatus of the present invention;

FIG. 2 is an enlarged right side elevational view of the structure shown in FIG. 1 shown partly broken away and in phantom and schematic form;

FIG. 3 is an enlarged side elevational view of one of the egg transporting cradles of the present invention shown in an egg receiving position;

FIG. 4 is a side elevational view of the cradle shown in FIG. 3 shown in an egg discharging position;

FIG. 5 is a front view of the cradle shown in FIG. 4;

FIG. 6 is a fragmentary cross-sectional plan view of the mounting arrangement for the egg transporting cradles of the present invention taken along the section lines VI—VI of FIG. 2;

FIG. 7 is a fragmentary front view of the structure shown in FIG. 6 taken along the section lines VII—VII of FIG. 6 with the cradles deleted;

FIG. 8 is a fragmentary rear perspective view showing a portion of the discharge side of the egg elevator shown in FIGS. 1 and 2;

FIG. 9 is an enlarged fragmentary right side elevational view of an improved egg singulating and counting mechanism of the present invention shown in phantom form in one position; and FIG. 10 is a front elevational view of the egg singulating and counting mechanism shown in FIG. 9.

DETAILED DESCRIPTION OF THE PREFERRED EMBODIMENT

Referring initially to FIG. 1 there is shown the egg handling apparatus of the present invention including an egg elevator 10 having an input end 12 to which three alternately horizontally and vertically staggered belt type egg input conveyors 14, 16, and 18 are secured. In the preferred embodiment, elevator 10 is designed to accommodate three such input belt conveyors although it is to be understood that the width and height of the elevator can be modified to accommodate any reasonable number of input conveyors. On the output end 13 of the elevator there is provided a main or accumulation conveyor 20 having a conveyor belt 22 conventionally supported on a roller bed frame 23 and suitable legs 26. Ledge 24 and 25 are provided such that eggs discharged onto the belt 22 will remain captive to the conveyor. Conveyor belt 22 is conventionally powered and moves in a direction indicated by arrow C to transport eggs from the collection area at which the elevator 10 is located to an egg processing and/or packaging area. In a typical installation, several elevators 10 will be positioned along the main conveyor 20 at spaced locations.

Elevator 10 comprises a pair of horizontally spaced trapazoidal shaped end frames 30 having a base 32, a top 34 including a horizontally extending ledge, and front and rear flange walls 36 and 38, respectively. Frames 30 are of substantially identical plate metal construction and provide the support for mounting input conveyors 14, 16, and 18 thereto by means of simplified pairs of mounting brackets 40 and 42 which serve the dual purpose of providing cross supports for frame members 30. As best seen in FIG. 2, the front walls 36 of frames 30 are inclined from the vertical by an angle α which in the preferred embodiment is approximately 10 degrees. As will be described more fully hereinafter, the angle of inclination assists entry of eggs from the belt conveyors onto the egg transporting cradles associated with the elevator.

Mounting bracket 40 includes as best seen in FIG. 1 with respect to conveyor 16, a first leg 41 secured to the front walls 36 of frames 30 by means of bolts 45 and a second horizontally extending wall 43 to which the flanges 13 of the belt conveyors 14, 16, and 18 are secured by means of bolts 15. Each of the brackets 42 are of generally U-shaped construction including an upper flange 46, a base 48 secured to the front walls 36 by means of bolts 47, and a lower horizontally extending ledge 49 on which the base of the conveyors 14, 16, and 18 rest and are mounted by suitable bolts. Flange 46 is inclined to serve as a bridging element between the end of the egg belt conveyor and the input of the cradles to provide continuous support for eggs transferred therebetween.

Each of the belt conveyors 14, 16, and 18 include endless loop belts 11 which transport eggs from egg trays extending along the front of the poultry cages in a conventional manner. These conveyors are described in greater detail in the above identified U.S. Pat. No. 3,166,175, the disclosure of which is incorporated herein by reference. As seen schematically in FIG. 2, the relative position of belt 11 with respect to the elevator 10 is shown with an egg 17 thereon about to be deposited onto one of the egg transporting cradles 70 as described more fully below.

As can be seen in FIG. 1, the belt conveyors 14, 16, and 18 are staggered horizontally such that conveyor 14 is mounted to the left side as seen in the FIG., conveyor 16 is mounted approximately in the middle, and conveyor 18 is mounted on the right edge. With such an arrangement eggs from each of these conveyors fill corresponding zones of the elevator 10.

Elevator 10 includes, as best seen in FIGS. 1, 2, 6, and 7, three axles extending between the end supports 30 including an upper axis 50 and lower axles 52 and 54 which are horizontally spaced at the base of the unit. The axles are rotatably mounted at opposite ends to the frames 30 by conventional bearings (not shown). Mounted at opposite ends of each of the axles between the frames are sprockets 51, 53, and 55, respectively, around which a pair of endless loop drive means comprising chains 56 are supported. Upper axle 50 is adjustably mounted at each end by for tensioning the chains 56 by means of an L-shaped bracket 58 to which the axle bearings are mounted. Bracket 58 slides in a slot 59 formed in support 30. Bracket 58 can be adjusted to tension the chain as desired by means of a threaded bolt 60 which extends through upper plate 34 and is held in fixed relationship by means of a nut 62. A drive motor 64 (shown schematically in FIG. 2) is mechanically coupled by linkage 65 to at least one of the axles in a conventional manner for providing drive to the elevator for rotating the chains 56 in a clockwise direction as shown in FIG. 2.

Thus, the chains 56 on each side of the elevator move in synchronism at a speed selected to provide a desired throughput of eggs from the input conveyors to the output conveyor.

Mounted between the chains 56 is a plurality of rows of egg transporting cradles 70 whose construction is shown in detail in FIGS. 3 through 5 and which are vertically and horizontally spaced to receive and transport eggs from the input conveyors to the output conveyor. Each of the cradles 70 are integrally molded of a resilient polymeric material such as ABS plastic and include a central block or base 72 including a key-shaped notch 74 formed transversely through the rear surface for captively attaching the cradles to bars 66 which are mounted at spaced intervals between chains 56. For this purpose as best seen in FIGS. 6 and 7, attached to spaced links 56' of chains 56 are L-shaped brackets 68 to which the flat stock bars 66 are secured by means of bolts 69. In the preferred embodiment, the bars were made of steel and had a thickness of ⅛ inch and a width of ¾ inch and extended between the chains. Slots 74 of cradles 70 are similarly dimensioned to provide a sliding fit. Bars 66 are mounted in horizontal alignment between chains 56 and each end attaches to chains 56 in the manner shown in FIGS. 6 and 7. The cradles 70 are positioned preferably on the bars 66 prior to installation. The resilient cradles are force fitted on the bars and held in place by the compression of the walls of slot 74 to bars 66.

In order to prevent eggs admitted to the elevator near the end walls 30 from falling off of the endmost cradles, a sheet metal guard 90 is provided and mounted as seen in FIG. 6. Guard 90 is of generally U-shaped construction having a first leg 92 coupled to the end walls 30, a second wall 94 extending inwardly from end walls 30 toward the rows of cradles, and an inwardly extending third wall 96 which is positioned immediately adjacent the endmost cradle on each side of the elevator. The shield 90 thus extends the entire length of the elevator on each of the sides and on both the input and output side of the elevator.

Each of the cradles 70 are generally U-shaped having the base 72 and a pair of asymmetric legs 76 and 78. Leg 76 and leg 78 are configured to nest against one another when mounted to the spaced bars 66 as best seen in FIG. 2. By having legs of adjacent cradles in direct contact, they form in essence a single finger which reduces unnecessary contact with eggs entering the elevator. The legs or fingers 76 and 78 define an opening 80 for receiving eggs.

As seen in FIG. 3, the lower leg 76 is configured to cradle an egg 17 closely against and adjacent the center section 72 of the cradle. This is to minimize the distance that the egg 17 is transferred once the cradle goes over the top 34 around axle 50 of the elevator and shifts to the second finger 78 in a position shown in FIG. 4. Thus, it is desirable on the input side of the conveyor to provide egg holding fingers which readily receive an egg from the conveyors 11 and cradle it as close as possible to the base of the generally U-shaped cradles. On the other hand, on the discharge end it is desirable to hold the egg out as far out as possible such that as seen in FIG. 8 a stripper mechanism 75 comprising a plurality of fingers 77 spaced between the fingers 76 and 78 of each of the cradles can readily strip the eggs from the elevator onto the belt 22 of the main conveyor. Stripper 75 is secured between the end frames 30 of the egg conveyor in a conventional manner.

To achieve these opposite design considerations, the legs of each of the cradles are asymmetric with the first legs 76 including a downwardly depending lip 81 for readily admitting an egg to the central opening 80 and a downwardly concavely curved surface 83 which once an egg is admitted to the cradle causes the egg to move to the bottom of the concave area 83 thus holding its closely adjacent the center portion 72 of each of the cradles. As the elevator moves the egg holding cradles rotates over the top and over axle 50 and the egg will roll onto the second leg and be captured by a now upwardly projecting lip 85 (FIG. 4) of the second leg 78. In order to facilitate movement of the egg out to this outwardly extended position for readily stripping from the elevator, leg 78 includes a substantially lineally extending section 87 between the base 72 and the tip 85. Thus, the lower leg 76 is concavely curved to hold the egg closely against the back of the cradle while upper or second leg 78 is inclined downwardly approximately 35 degrees to permit the egg to roll outwardly against lip 85 for readily removing the egg from the elevator.

As noted above, the input end 36 of the elevator is inclined at an angle of approximately 10 degrees which, as best seen in FIG. 2, causes the eggs to readily roll within the concave pocket 83 formed by the cradles. The eggs naturally are held between adjacent cradles which are spaced approximately 1¼ inch from center to center and have legs with a width of approximately ⅜ inch. This leaves approximately ⅞ inch horizontal spacing between adjacent legs which is sufficient to capture hens' eggs. The opening between tip 85 and tip 81 is approximately 3 inches to readily admit eggs from conveyor 11. The depth of each cradle is approximately 2¾ inches. In the event that an egg arrives and contacts the overlying tips of adjacent cradles, however, the resilient material from which the legs are made causes the egg to relatively gently bounce off of the tips without breakage. The conveyor 11 will then cause the egg to drop into the cradle as soon as the next opening 80 is available.

In order to maintain a count of the eggs passing through any given elevator, and thus monitor the activities of hens in certain rows of cages, egg counters are typically provided. A convenient location for mounting such egg counters are on the egg collecting and elevating structure just above the stripper plates 75 shown in FIG. 8. For such purpose, the counting mechanism shown in FIGS. 9 and 10 is employed and is now described.

The egg counting unit 100 is a separate assembly as seen in FIG. 10 which is mounted on upper and lower support plates 102 and 104, respectively, which can be bolted to the lips 38 of the elevator just above the stripper assembly 75 as seen in FIG. 2. Basically, the counter is divided into three zones or lanes as indicated in FIG. 10 by arrows D, E, and F whereby eggs from the three input conveyors 14, 16, and 18 can be separately counted as they pass through the counting assembly 100 in the particular zones. Each of the zones D, E, and F are formed by alternate partition walls 106 and 108 as seen in FIG. 10. Each of the zones includes at its center location a partition wall 106 secured between end plates 102 and 104 and a shorter partition wall 108 at the boundry between adjacent zones. Partition walls 106 and 108 extend between the fingers of the cradles 70. The alternate length partition walls 106 and 108 extend longitudinally along the path of travel of eggs and present longitudinally staggered leading edges 105 and 107 facing the upstream direction of egg flow. Such construction assures that eggs entering the counter whose partition walls are directed inwardly and extend between the fingers 76 and 78 of the elevator are singulated and drop between partition walls of a given zone. By providing partition walls of alternate different lengths, eggs will instead of bunching up between two partition walls simply fall between from one of the longer walls 106 into a lane between such wall and an adjacent shorter partitioning wall 108. If all the walls were of the same length, however, they might get crushed between two adjacent walls as they attempted to enter the same counting lane within a given zone.

As seen in FIG. 10, each of the lanes D, E, and F are divided into two counting zones defined as the area between partition walls 106 and 108 or in the case of the end areas the space outside of the partitions 106. In each of the counting zones there is provided a pressure responsive switch 110 with an egg contacting feeler 112 which, as best seen in FIG. 9 in phantom form, extends into the direction of travel of an egg supported by a cradle 70. Counter switch assembly 110 includes a sensor switch 114 such as a commercially available MICRO-SWITCH which is pivotally mounted by axle 115 to a bracket 116 secured to one of the partition walls. Switch 114 includes a counter weight disc 118 secured to the switch body 114 by means of a U-shaped bracket 120. The disc 118 is mounted on a threaded rod 122 extending from bracket 120 and is adjusted thereto by means of a pair of backing nuts 126.

Thus, as seen in FIG. 9, the counter switch assembly 110 is normally in a position shown in phantom lines whereby feeler 112 extends between fingers of adjacent cradles. When an egg is present, it is deflected outwardly as shown in solid lines in FIG. 9 while the egg 17 contacts arm 112 and actuates switch 114. Each of the switches 114 are coupled to an accumulating counter of conventional construction for accumulating the total number of eggs counted by the switches 116 of counter unit 100. If desired, separate counters for each of the lanes D, E, and F or in fact each of the zones in each lane can also be provided although generally it is only necessary to count the total number of eggs passing over the elevator. By providing the pivotally mounted switch which is counterweighted, it can be assured that the egg will actuate the switch 114 by permitting the feeler 112 to extend well inwardly into the elevator structure to assure contact with the egg while at the same time preventing breakage of the egg since the switch can pivot out of the way as shown in solid lines in FIG. 9.

Various modifications to the preferred embodiments of the invention described herein will become apparent to those skilled in the art. Such modifications will, however, fall within the spirit and scope of the present invention as defined by the appended claims.

The embodiments of the invention in which an exclusive property or privilege is claimed are defined as follows:

1. An egg transporting system for receiving and collecting eggs from a plurality of infeed conveyors and discharging the eggs at an output conveyor comprising:
   a plurality of egg receiving cradles each of generally U-shaped construction and having a pair of asymmetric legs shaped for alternately receiving eggs from an infeed conveyor and discharging eggs to an output conveyor, said cradles each including a base, a first concavely curved leg joined to said base and cradling an egg against said base when the first leg is in a lower position, and a second leg inclined linearly downwardly and having an upwardly extending tip such that when the second leg is in a lower position an egg will move outwardly from said base and be held by said tip; and
   means for moving said cradles between the infeed conveyor and the output conveyor such that an egg is received by one leg of the cradle and discharged by the other leg, said moving means comprising endless loop drive means and means for supporting said endless loop drive means for movement in generally vertical directions.

2. The apparatus as defined in claim 1 and including means for mounting said cradles to said endless loop drive means in an array of rows and columns with said first leg of each cradle in its lower position when receiving eggs from an input conveyor on one end of the apparatus and said second leg in its lower position when discharging eggs to an output conveyor on another end of the apparatus.

3. The apparatus as defined in claim 2 and further including a pair of vertically extending horizontally spaced frame members and wherein said endless loop drive means comprises a pair of horizontally spaced chains supported on sprockets rotatably mounted to said frame members, and wherein said mounting means comprises a plurality of flat bars mounted to and extending between said chains for receiving said cradles.

4. The apparatus as defined in claim 3 wherein said base of each of said cradles is generally rectangular and includes a transverse bar receiving slot extending therein for captively mounting said cradles to said bars, said cradles being slid onto said bars at said slots.

5. The apparatus as defined in claim 4 wherein said bars are mounted to said chains in vertically spaced relationship and said first leg of each cradle is so configured to nest with the second leg of an adjacent cradle, said nested cradle legs in effect defining a single leg to thereby reduce unnecessary contact with eggs entering the egg transporting system.

6. The apparatus as defined in claim 5 wherein said cradles are integrally made of a resilient polymeric material.

7. The apparatus as defined in claim 6 wherein said chains define upward and downward runs on opposite ends of said frames and wherein said sprockets are mounted such that said upward run facing the input conveyors is inclined from the vertical to facilitate the transfer of eggs onto said first legs of said cradles.

8. For use in a continuous loop egg elevator in which eggs are received on one side and transferred to be discharged on an opposite side, improved egg handling cradles for attachment to the continuous loop, each cradle comprising:
   a generally U-shaped member having a base and a pair of fingers extending outwardly from said base, a first finger of said pair being concavely curved and having a depending lip, said first finger configured to receive and hold an egg adjacent and in contact with said base, and a second finger of said pair extending linearly downwardly from said base and including a lip such that when the cradle position is in the discharge orientation on the elevator an egg moves outwardly from said base and held by said lip to facilitate removal from the elevator, said base of said cradle being rectangular and having a width greater than the width of said fingers, said base further including a transverse slot means for attaching said cradle to the elevator.

9. The apparatus as defined in claim 8 wherein said cradles are integrally formed of a resilient polymeric material.

10. The apparatus as defined in claim 8 wherein said cradles are made of ABS plastic.

11. An egg elevator comprising:
   a pair of horizontally spaced end frames defining an input end and an output end of said elevator;
   axle means rotatably supported between said frames in vertically spaced relationship, said axle means including an upper axle near the top of said frames and a pair of horizontally spaced lower axles near the bottom of said frames;
   a pair of chains, and sprocket means for coupling said chains around said axles in spaced relationship to one another said lower axles positioned such that the run of chain on the input end of said elevator is inclined toward the output end;
   egg conveying cradle means extending between said chains for transporting eggs vertically between said input and output ends of said elevator;
   a plurality of mounting bars extending between said chains and wherein said cradle means comprises a plurality of cradles mounted on said bars in horizontally spaced relationship, each of said cradles comprising a generally U-shaped member having a rectangular base and first and second legs, and wherein said first leg is concavely curved and has a depending tip for holding an egg against said base when said first leg is in a lower position in the input end of said elevator, and wherein said second leg is in a lower position and inclined downwardly when in the output end of said elevator, said second leg having a lineally extending portion and including an upwardly extending tip for holding an egg away from said base, said bars spaced and said cradles dimensioned so that said first legs nest with said second legs of vertically adjacent cradles;

egg counting means coupled to said end frames at said output end and comprising:

a plurality of spaced partition walls extending longitudinally along the path of travel of the eggs between said cradle means and spaced to allow an egg to pass between adjacent walls and wherein the upstream ends of adjacent walls are straggered to prevent eggs in adjacent lanes from colliding as they enter the space between said walls; and egg sensing means positioned to detect eggs as they pass between said partition walls.

12. The apparatus as defined in claim 11 and further including a plurality of pairs of cross supports extending between said end frames on the input end, each pair of cross supports including vertically spaced flange means extending horizontally outwardly for securing input egg conveying means to said input end of said elevator.

13. The apparatus as defined in claim 12 and further including slide means for adjustably supporting said upper axle.

* * * * *